US012472434B2

(12) United States Patent
Xu

(10) Patent No.: US 12,472,434 B2
(45) Date of Patent: Nov. 18, 2025

(54) METHOD AND APPARATUS FOR CONTROLLING ROLE IN MULTI-PLAYER COMPETITION GAME, AND ELECTRONIC DEVICE

(71) Applicant: NETEASE (HANGZHOU) NETWORK CO., LTD., Zhejiang (CN)

(72) Inventor: Lanting Xu, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 318 days.

(21) Appl. No.: 18/043,584

(22) PCT Filed: Jan. 29, 2021

(86) PCT No.: PCT/CN2021/074400

§ 371 (c)(1),
(2) Date: Mar. 1, 2023

(87) PCT Pub. No.: WO2022/048104

PCT Pub. Date: Mar. 10, 2022

(65) Prior Publication Data

US 2023/0310996 A1 Oct. 5, 2023

(30) Foreign Application Priority Data

Sep. 4, 2020 (CN) ......................... 202010924072.0

(51) Int. Cl.
*A63F 13/56* (2014.01)
*A63F 13/35* (2014.01)
(Continued)

(52) U.S. Cl.
CPC .............. *A63F 13/56* (2014.09); *A63F 13/35* (2014.09); *A63F 13/533* (2014.09); *A63F 13/812* (2014.09); *A63F 13/92* (2014.09)

(58) Field of Classification Search
CPC ........ A63F 13/56; A63F 13/35; A63F 13/533; A63F 13/812; A63F 13/92; A63F 13/352; A63F 13/795
(Continued)

(56) References Cited

U.S. PATENT DOCUMENTS 4,738,451 A * 4/1988 Logg ....................... A63F 13/58 463/2
5,863,248 A * 1/1999 Mine ....................... A63F 13/57 463/31
(Continued)

FOREIGN PATENT DOCUMENTS

CN 1385783 A 12/2002
CN 106488789 A 3/2017
(Continued)

OTHER PUBLICATIONS

1st Office Action dated Dec. 26, 2023 for Chinese Application No. 202010924072.0.
(Continued)

*Primary Examiner* — Michael A Cuff
(74) *Attorney, Agent, or Firm* — Qinghong Xu

(57) ABSTRACT

A method and an apparatus for controlling a role in a multi-player competition game, and an electronic device. The method includes: receiving a role control instruction from a first terminal device, and determining a target role corresponding to the role control instruction; determining a target role group to which the target role belongs, and a target terminal device corresponding to the target role group based on correspondence; and executing the role control
(Continued)

instruction on the target role in response to the target terminal device being the first terminal device.

17 Claims, 5 Drawing Sheets

(51) Int. Cl.
*A63F 13/533* (2014.01)
*A63F 13/812* (2014.01)
*A63F 13/92* (2014.01)

(58) Field of Classification Search
USPC .............................................................. 463/31
See application file for complete search history.

(56) References Cited

U.S. PATENT DOCUMENTS

| | | | | |
|---|---|---|---|---|
| 6,280,323 | B1 * | 8/2001 | Yamazaki | A63F 13/5255 463/31 |
| 6,431,982 | B2 * | 8/2002 | Kobayashi | A63F 13/812 463/2 |
| 8,616,946 | B2 * | 12/2013 | Yanagisawa | A63F 13/56 463/31 |
| 2002/0065119 | A1 * | 5/2002 | Togami | A63F 13/812 463/4 |
| 2005/0003877 | A1 * | 1/2005 | Cummings | A63F 13/812 463/4 |
| 2005/0176502 | A1 * | 8/2005 | Nishimura | A63F 13/426 463/31 |
| 2012/0184368 | A1 * | 7/2012 | Yamaoka | A63F 13/56 463/31 |
| 2013/0203509 | A1 * | 8/2013 | Reed | A63F 13/216 463/43 |
| 2013/0337916 | A1 * | 12/2013 | Saretto | A63F 13/847 463/43 |
| 2014/0370950 | A1 * | 12/2014 | Hansson | A63F 13/00 463/9 |
| 2015/0283443 | A1 * | 10/2015 | Dunser | A63B 71/0619 473/422 |
| 2015/0336006 | A1 * | 11/2015 | Motokura | A63F 13/79 463/43 |
| 2016/0158653 | A1 * | 6/2016 | Fear | A63F 13/30 463/29 |
| 2019/0269987 | A1 | 9/2019 | Kim et al. | |

FOREIGN PATENT DOCUMENTS

| | | | |
|---|---|---|---|
| CN | 109157835 | A | 1/2019 |
| CN | 109173250 | A | 1/2019 |
| CN | 111111196 | A | 5/2020 |
| CN | 111481932 | A | 8/2020 |
| CN | 111957044 | A | 11/2020 |
| WO | 2010016324 | A1 | 2/2010 |

OTHER PUBLICATIONS

International Search Report dated Jun. 2, 2021 of International Application No. PCT/CN2021/074400.

* cited by examiner

METHOD AND APPARATUS FOR CONTROLLING ROLE IN MULTI-PLAYER COMPETITION GAME, AND ELECTRONIC DEVICE

CROSS REFERENCE TO RELATED APPLICATION

The present disclosure is a U.S. national phase application of International Application No. PCT/CN2021/074400 filed on Jan. 29, 2021, which claims priority to Chinese Patent Application No. 202010924072.0, filed on Sep. 4, 2020 and entitled "METHOD AND APPARATUS FOR CONTROLLING ROLE IN MULTI-PLAYER COMPETITION GAME, AND ELECTRONIC DEVICE", which are incorporated herein by reference in their entireties for all purposes.

TECHNICAL FIELD

The present disclosure relates to the technical filed of controlling of a virtual role, in particular to a method and an apparatus for controlling a role in a multi-player competition game, and an electronic device.

BACKGROUND

In traditional football games, gamers can control different players in a football team for competition. Different competition modes can be available according to number of players, for example, 1V1 mode, multi-player mode and 22-player mode. In the 1V1 mode, there are in total 2 gamers in the game for competition, and at any certain moment, each gamer can control only one of 11 players on the court. The controlled player can be switched by operating on a player-switching button, or a ball-passing button, or by changing possession of the ball. In the multi-player mode, the same number of gamers on both sides of football teams is required. During the game, each gamer can control, in addition to the player he is controlling, all other players of his team. In the 22-player mode, both sides have 11 gamers participating in the game, and each gamer can only control one player.

SUMMARY

In one aspect of embodiment of the present disclosure, there is provided a method for controlling a role in a multi-player competition game, wherein role grouping information of the competition game is provided through a server, the role grouping information including a role group to which each role of at least one game party in the competition game belongs, and the server stores correspondence between a terminal device and the role group in a current competition match in advance; the method including: receiving a role control instruction from a first terminal device, and determining a target role corresponding to the role control instruction; determining a target role group to which the target role belongs and a target terminal device corresponding to the target role group based on the correspondence; and executing the role control instruction on the target role in response to the target terminal device being the first terminal device.

In another aspect of embodiments of the present disclosure, there is provided a method for controlling a role in a multi-player competition game, wherein a graphical user interface of the competition game is displayed through a terminal device, the terminal device is pre-configured with at least one role group, and correspondence between the role group and the terminal device is stored in a server of the competition game; the method including: receiving a control operation on a target role from the terminal device, and generating a role control instruction, wherein the role control instruction carries a role identifier of the target role; and sending the role control instruction to the server to trigger the server to determine based on the correspondence and the role identifier whether the terminal device has permission of controlling of the target role; and executing the role control instruction on the target role when the terminal device has the permission of controlling of the target role.

In another aspect of embodiments of the present disclosure there is provided an apparatus for controlling a role in a multi-player competition game, wherein role grouping information of the competition game is provided through a server, the role grouping information including a role group to which each role of at least one game party in the competition game belongs, and the server stores correspondence between a terminal device and the role group in a current competition match in advance; the apparatus including: a target role determination module configured to receive a role control instruction from a first terminal device, and determine a target role corresponding to the role control instruction; a role group and terminal device determination module configured to determine a target role group to which the target role belongs and a target terminal device corresponding to the target role group based on the correspondence; and a role control instruction execution module configured to execute the role control instruction on the target role in response to the target terminal device being the first terminal device.

In another aspect of embodiments of the present disclosure there is provided an apparatus for controlling a role in a multi-player competition game, wherein a graphical user interface of the competition game is displayed through a terminal device, the terminal device is pre-configured with at least one role group, and correspondence between the role group and the terminal device is stored in a server of the competition game; the apparatus including: a role control instruction generation module configured to receive a control operation on a target role from the terminal device, and generate a role control instruction, wherein the role control instruction carries a role identifier of the target role; and a role control instruction sending module configured to send the role control instruction to the server to trigger the server to determine based on the correspondence and the role identifier whether the terminal device has permission of controlling of the target role; and execute the role control instruction on the target role when the terminal device has the permission of controlling of the target role.

In another aspect of embodiments of the present disclosure there is provided an electronic device, including a processor and a memory, wherein the memory stores computer-executable instructions that can be executed by the processor, and the processor executes the computer-executable instructions to implement the method for controlling the role in the multi-player competition game described above.

In another aspect of embodiments of the present disclosure there is provided a computer-readable storage medium having computer-executable instructions stored thereon, wherein when the computer-executable instructions are called and executed by a processor, the processor is caused to implement the method for controlling the role in the multi-player competition game described above.

In order to make the above purposes, features and advantages of the present disclosure more obvious and understandable, a detailed description of preferred embodiments will be provided in the following in combination with the drawings.

BRIEF DESCRIPTION OF THE DRAWINGS

In order to more clearly describe specific embodiments of the present disclosure or technical solutions in the prior art, drawings required in specific embodiments or in the prior art will be introduced briefly in the following. It is apparent that the drawings in the following are some embodiments of the present disclosure. For those of ordinary skill in the art, other related drawings can also be obtained according to these drawings without any creative efforts.

DETAILED DESCRIPTION

Figure 1:
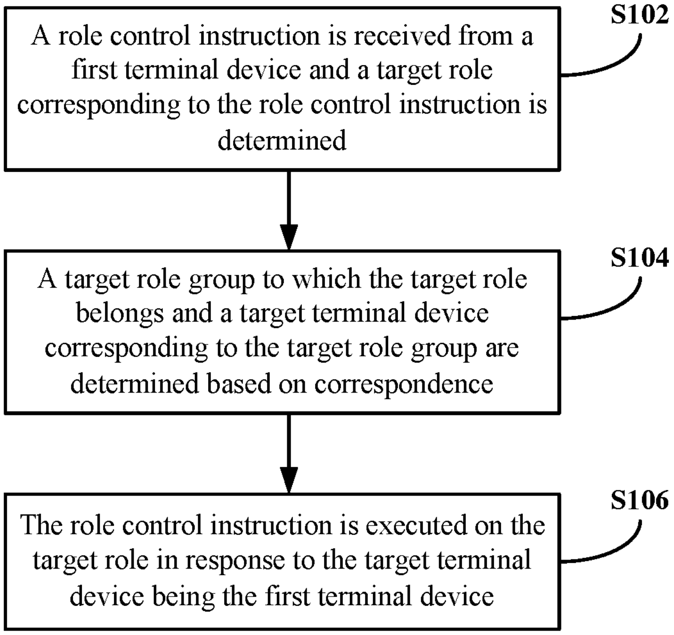
FIG. 1 is a flowchart of a method for controlling a role in a multi-player competition game provided by embodiments of the present disclosure.

In order to make purposes, technical solutions and advantages of embodiments of the present disclosure clearer, technical solutions according to embodiments of the present disclosure will be described clearly and completely below with reference to the drawings according to embodiments of the present disclosure. Obviously, embodiments described are some, but not all, embodiments of the present disclosure. All other embodiments obtained based on embodiments in the present disclosure, by those of ordinary skill in the art without any creative efforts, fall in the scope of the present disclosure.

In the multi-player mode of traditional football games, the number of gamers in different football teams must be the same, and the gamer can control all the players on the court in his team, easily resulting in a chaotic situation, and thus reducing game experiences of the gamers. Embodiments of the present disclosure provide a method for controlling a role in a multi-player competition game, an apparatus for controlling a role in a multi-player competition game and an electronic device. Embodiments of the present disclosure can be applied to devices that can realize human-machine interaction, such as clients, servers, computers, mobile phones, tablets, game consoles, etc., and especially can be applied to the scenario of a multi-player competition game.

In order to facilitate understanding of embodiments of the present disclosure, a method for controlling a role in a multi-player competition game disclosed by embodiments of the present disclosure will be introduced in detail first.

Embodiments of the present disclosure provide a method for controlling a role in a multi-player competition game. A server is used to provide role grouping information of the game. The role grouping information includes a role group to which each role controlled by at least one party in the game belongs. The server stores correspondence between a terminal device and the role group in a current competition match in advance.

The multi-player competition game in embodiments can be a game where multiple gamers are grouped in groups for competition, such as various ball games. The game may include multiple roles, which can be controlled by gamers. The roles in the competition game can be grouped into multiple role groups in advance. Generally, one role can only belong to one role group in a certain grouping mode. There can be various grouping approaches for the gamer to choose. Each party in the game can choose the same or different grouping approaches for each competition match.

For example, in the football game, for each football team, there are 11 players in total. The server can record the grouping information of 11 players in each team. For example, players 1-3 are grouped in group 1, players 4-8 are grouped in group 2, and players 9-11 are grouped in group 3. As a result, the football team can be grouped into three role groups in such a grouping approach, and the grouping approach can be recorded as role grouping information.

A variety of different grouping approaches can be recorded in the role grouping information stored by the server. A player may belong to different role groups under different grouping approaches. A player under a certain grouping approach can belong to one role group only. For example, player 1 cannot belong to both group 1 and group 2 under a certain grouping approach.

In addition to providing the role grouping information, the server can also store the correspondence between a terminal device and the role group in a current competition match in advance. The correspondence can indicate that the gamer using the terminal device can control all roles in the role group. For example, group 1 includes roles 1-3, and group 1 corresponds to terminal device A, then the gamer using the terminal device A can control roles 1-3 in group 1, which can also be understood that the gamer has permission of controlling of roles 1-3.

Based on above description, and referring to the flow chart of the method for controlling the role in the multi-player competition game shown in FIG. 1, the method for controlling the role in the multi-player competition game includes following steps.

In a step S102, a role control instruction is received from a first terminal device and a target role corresponding to the role control instruction is determined.

A first gamer can operate on the first terminal device connected communicatively with the server, to enable the first terminal device to generate the role control instruction. The first terminal device can be a mobile phone, a computer, a game console and other devices. The gamer can operate through a mouse, a keyboard, a touch screen, a handle and other devices. The first terminal device generates the role control instruction based on the gamer's operation.

The server can parse the role control instruction and determine the target role corresponding to the role control instruction. The target role can be understood as the role that the first gamer wants to control. For example, if the first gamer wants to control role 1, the first terminal device can generate the role control instruction for role 1 and send the role control instruction to the server. The server can respond to the role control instruction and determine that the target role corresponding to the role control instruction is role 1.

In a step S104, a target role group to which the target role belongs and a target terminal device corresponding to the target role group are determined based on correspondence.

The server can provide role grouping information, and has stored the correspondence between a terminal device and a role group in advance. The target role group to which the target role belongs can be determined according to the role grouping information, and the target terminal device corresponding to the target role group can be determined according to the correspondence above.

For example, if the target role is role 1, and the role grouping information indicates that roles 1-3 belong to group 1, then the target role group can be group 1. If the correspondence between the terminal device and the role group indicates that group 1 corresponds to the first terminal device, then the target terminal device can be the first terminal device.

In a step S106, the role control instruction is executed on the target role in response to the target terminal device being the first terminal device.

If the target terminal device is the first terminal device, it means that the first gamer who operates the first terminal device has permission of controlling of the target role, and the server can execute role control instructions on the target role.

According to the method for controlling the role in the multi-player competition game provided by embodiments of the present disclosure, the role grouping information of the role group to which each role belongs in the game and the correspondence between the terminal device and the role group are recorded through the server. The role control instruction is received from the first terminal device to determine the target role, and whether the target role corresponds to the first terminal device or not is determined based on the correspondence above. If the target role corresponds to the first terminal device, the server executes the role control instruction.

In this mode, the server will execute the role control instruction from the terminal device that has a correspondence with the role. The gamer cannot control the role that does not correspond to his own terminal device. As a result, the roles controlled by different gamers can be different. One gamer can control multiple roles to in the game and the roles he is controlling are not controlled by other gamers, so as to improve the game experience of the gamer.

Figure 2:
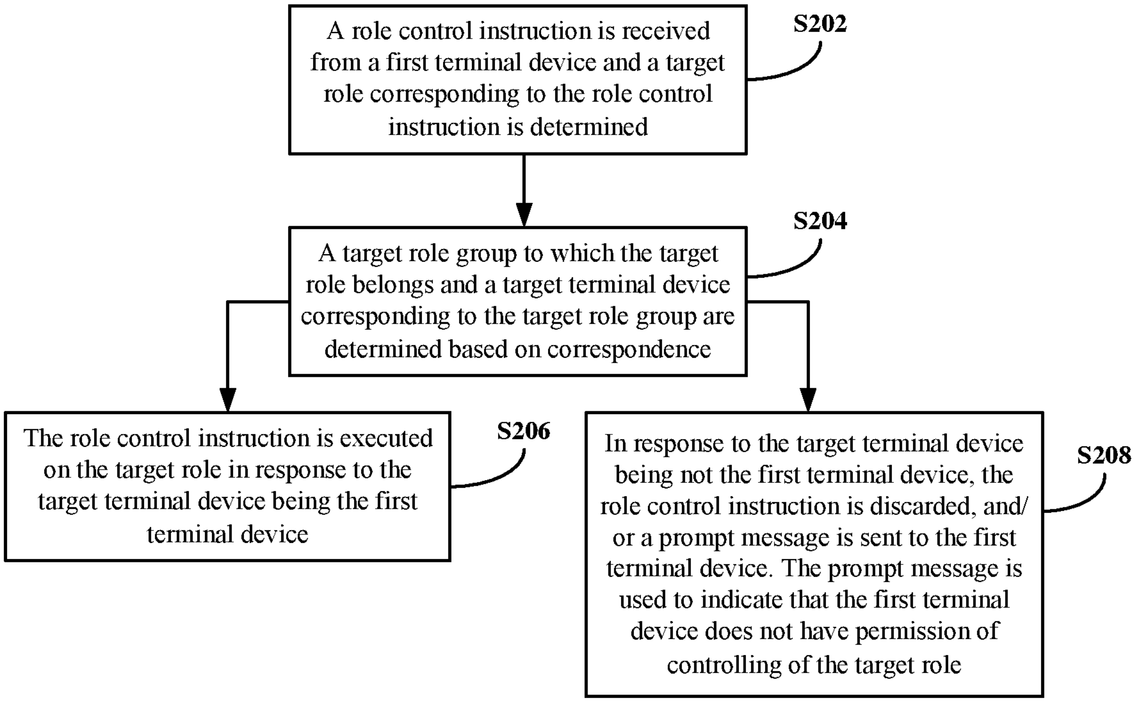
FIG. 2 is a flowchart of another method for controlling a role in a multi-player competition game provided by embodiments of the present disclosure.

Embodiments of the present disclosure provide another method for controlling a role in a multi-player competition game, which is implemented on the basis of above embodiments. In some embodiments, as shown in FIG. 2, when the target terminal device is not the first terminal device, the method for controlling the role in the multi-player competition game includes following steps.

In a step S202, a role control instruction is received from a first terminal device and a target role corresponding to the role control instruction is determined.

The football game is taken as an example. In the multi-player mode of the football game, different football teams require the same number of gamers. Each gamer has the permission of controlling of 11 players in his own team, but cannot control players who have been controlled by other gamers. For example, gamer A can control all 11 players in his team, and if player 1 is being controlled by gamer B, then gamer A cannot control player 1.

In order to achieve difference in the number of gamers in different teams, and to achieve reasonable allocation of the permissions of controlling on roles by the gamer, embodiments of the present disclosure can reasonably group the roles, so that gamers in a team can control all roles in the team. In some embodiments, the server can provide role grouping information to gamers through following steps, role grouping information is provided to the terminal device through a graphical user interface of the competition game.

The role grouping information includes at least one grouping approach. The gamers can choose a grouping approach approved by themselves from the grouping approaches provided by the role grouping information and return the chosen method to the server. In some embodiments, steps A1-A2 can be executed.

In a step A1, at least one grouping approach is displayed to the terminal device through a graphical user interface of the competition game. One grouping approach corresponds to one piece of role grouping information, and each role belongs to only one role group under the grouping approach.

The server can include a number of pre-determined grouping approaches, which can be uploaded by a game developer or stored to the server by the gamer through the terminal device. One grouping approach corresponds to one piece of role grouping information. Each grouping approach includes multiple role groups, and each role group contains at least one role.

For example, the football game is taken as an example, for the role grouping information under a certain grouping approach, player 1 can be grouped into group 1, players 2-5 can be grouped into group 2, players 3-7 can be grouped into group 3, and players 8-11 can be grouped into group 4. As can be seen, one role group may include one role only, and one role can only belong to only one role group, but not to multiple role groups. As a result, a role can be ensured to be controlled by only one player, so as to prevent multiple players from controlling the same role.

The server can group the roles according to the function of the role, so that the roles grouped into the same role group are the roles with the same identity type. Herein, the same identity type can be understood as the same function. The server can group roles with the same function into the same role group. For example, if both player 1 and player 2 are attacking strikers, then player 1 and player 2 can be grouped into the same role group. However, player 1 and player 2 can also be grouped into different role groups.

In some embodiments, the football game is taken as an example, each football team has its own formation during the competition, such as a formation of 4-3-3, a formation of 4-3-2-1, etc. The formation determines the competition style of the team (the attack type, the ball-passing and ball-controlling type, or the counterattack type) to a large extent. Therefore, the role can be grouped according to following grouping approach, the grouping approaches of role groups include a grouping approach of attack type, a grouping approach of ball-passing and ball-controlling type, and a grouping approach of counterattack type.

Players in each formation of a football team in the game can be divided into several parts for gamers to choose and control. For example, in a 3V3 mode, if a formation of 4-3-3 is used, the permission of controlling of 3 strikers will be arranged in one role group, the permission of controlling of 3 midfielders will be arranged in one role group, and the permission of controlling of 4 defenders will also be arranged in one role group. Since one gamer can only choose one player to control, the division of labor between gamers will be very clear. In some embodiments, the player being grouped into the corresponding role group at a certain position in different formations is realized through a configuration table. Regardless of the number of gamers on one side, the permission of controlling of some players in the game can be obtained according to the division of control permission of role groups.

The graphical user interface of the competition game can be understood as an interface displayed on a screen of a terminal device. Through the interface displayed on the screen of the terminal device, multiple grouping approaches can be displayed to the gamer so that the gamer can choose an appropriate grouping approach.

The first gamer can set the correspondence of the role group when choosing the role group, and the server can receive and store the correspondence, which can be performed through following steps. A role group choosing operation from the first terminal device based on the role grouping information is received, and correspondence between the first terminal device and the role group chosen through the role group choosing operation is stored.

For example, the first gamer can determine the role group corresponding to the first terminal device through the role group choosing operation and send the correspondence to the server. The server can store the correspondence. In this way, the first gamer can choose his own appropriate role group to control the roles in the role group.

In a step A2, a grouping approach choosing operation from the first terminal device of a first game party in the competition game is received, and the role group under the grouping approach chosen through the grouping approach choosing operation is set as an optional state.

The gamer can view through the graphical user interface of the terminal device multiple grouping approaches sent by the server. The grouping approach choosing operation is that the gamer can choose one of the grouping approaches and return a chosen result to the server.

In some embodiments, the first terminal device can be controlled by the first gamer. The first gamer belongs to the first game party, and the gamers in one game party belong to the same team, and can control different roles of the same team.

If the first gamer agrees with the grouping approach sent by the server, he can perform the grouping approach choosing operation, to choose one grouping approach from multiple grouping approaches and send the choosing result to the server. After receiving the choosing result, the server can set the role groups under the chosen grouping approach as an optional state, so that the gamers of the first game party (i.e., the gamers in the same team as the first gamer) can choose the role groups under the chosen grouping approach.

For example, the first gamer chooses that group 1 is composed of player 1, group 2 is composed of players 2-5, group 3 is composed of players 3-7, and group 4 is composed of players 8-11. The server can set group 1-group 4 as optional states, and the gamers of the first game party can choose their role groups from group 1-group 4.

In addition, it should be noted that the role groups chosen through the role grouping choosing operation of the first terminal device is one or more role groups. The first gamer can choose a number of different grouping approaches, which can be displayed to other terminal devices of the first game party through the server, so that other gamers of the first game party can make further choices.

According to the method provided by embodiments of the present disclosure, the server can display at least one grouping approach to the terminal device through the graphical user interface of the competition game, the terminal device performs the grouping approach choosing operation, and the server can set the role groups under the grouping approach chosen through the grouping approach choosing operation as an optional state. The terminal devices of the first game party can choose role groups from above grouping approach, and the terminal devices of the first game party can choose different roles in the role group to ensure that the terminal devices of the first game party can control different roles.

According to the method provided by embodiments of the present disclosure, difference in the number of gamers for competition can be realized, that is, the number of terminal devices of both sides of the game is the same or different. Different game parties can choose different grouping approaches. The number of role groups in different grouping approaches is different, which can realize the competition game with asymmetric number of gamers participating in.

Figure 3:
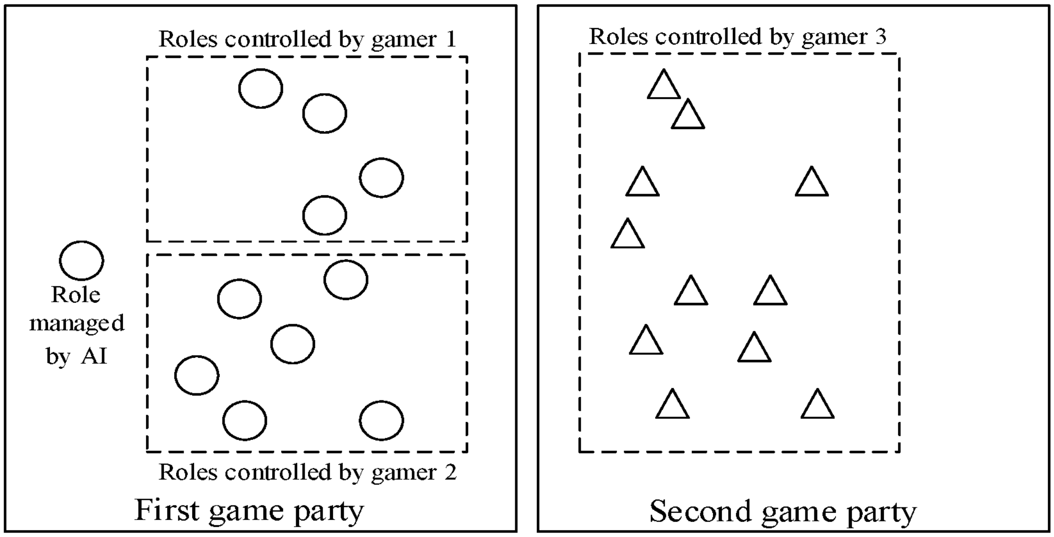
FIG. 3 is a schematic diagram of role grouping in a multi-player competition game provided by embodiments of the present disclosure.

FIG. 3 is a schematic diagram of role grouping in a multi-player competition game provided by embodiments of the present disclosure. As shown in FIG. 3, on the left side there are roles of the first game party (represented by a circle in FIG. 3), and on the right side there are roles of a second game party (represented by a triangle in FIG. 3). The first game party has two gamers, namely gamer 1 and gamer 2, and the second game party has only one gamer, namely gamer 3. As shown in FIG. 3, gamer 1 of the first game party controls 4 roles, gamer 2 controls 6 roles, and there is one role who is not controlled by the gamer, which is an AI (Artificial Intelligence) managed role. Gamer 3 of the second game party controls 11 roles. As a result, the competition game with asymmetric number of gamers participating in can be realized.

In a step S204, a target role group to which the target role belongs and a target terminal device corresponding to the target role group are determined based on correspondence.

The server needs to check the role control instruction to determine whether the first gamer has the permission of controlling of the target role. The server can search for the target role from the received role control instruction, and determine the target role group to which the target role belongs based on the role grouping information. Since the server has stored the correspondence between the terminal device and the role group in a current competition match in advance, the terminal device corresponding to the target role group can be determined based on the correspondence, which is called as the target terminal device.

In a step S206, the role control instruction is executed on the target role in response to the target terminal device being the first terminal device.

If the target terminal device is the first terminal device, it means that the first gamer who operates the first terminal device has permission of controlling of the target role, and the server can execute role control instructions on the target role.

Step S208: in response to the target terminal device being not the first terminal device, the role control instruction is discarded, and/or a prompt message is sent to the first terminal device. The prompt message is used to indicate that the first terminal device does not have permission of controlling of the target role.

If the target terminal device is not the first terminal device, it means that the first gamer does not have the permission of controlling of the target role. The server cannot execute the role control instruction on the target role. The server can discard the role control instruction. In addition, the server can also send a prompt message to the first terminal device to prompt that the first gamer does not have the permission of controlling of the target role, so that the first gamer can modify or revoke the role control instruction.

According to the method provided by embodiments of the present disclosure, the permission of controlling of roles in the multi-player competition game can be divided, so that different gamers can have the permission of controlling of at least one role. Belonging of different roles can be determined in advance, so that the roles with the same identity type belong to the same gamer, thus improving the game experience of the gamers in the multi-player competition game. In some embodiments, different teams in the multi-player competition game can use different role grouping approaches, so that the number of gamers in each team can be different, so as to realize the multi-player competition game with asymmetric number of gamers participating in.

Embodiments of the present disclosure also provide another method for controlling a role in a multi-player competition game. A graphical user interface of the competition game is displayed through a terminal device. The terminal device is pre-configured with at least one role group, and correspondence between the role group and the terminal device is stored in a server of the competition game.

The terminal device in embodiments can be a mobile phone, a computer, a tablet, a game console and other devices. These terminal devices all have screens. A graphical user interface of the competition game can be displayed on the screen of the terminal device. Gamers can determine their corresponding role groups through the graphical user interface. The number of role groups configured by the terminal device is uncertain, which can be one or more role groups. The correspondence between the role group and the terminal device is stored in the server that communicates with the terminal device.

Figure 4:
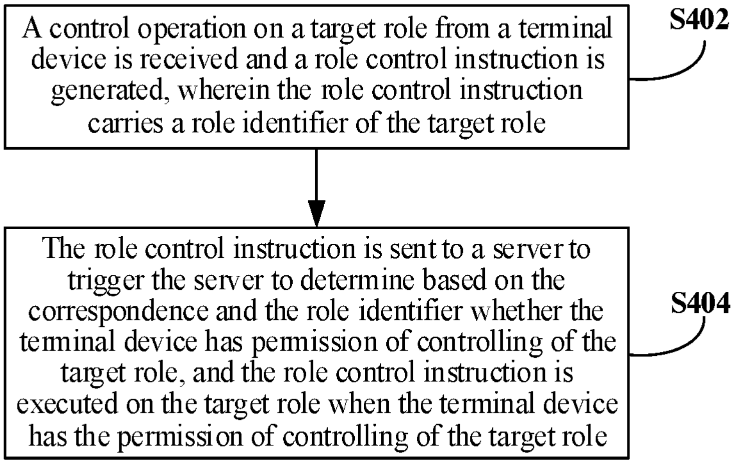
FIG. 4 is a flowchart of another method for controlling a role in a multi-player competition game provided by embodiments of the present disclosure.

Referring to FIG. 4, which is a flowchart of another method for controlling a role in a multi-player competition game provided by embodiments of the present disclosure, the method for controlling the role in the multi-player competition game includes following steps.

In a step S402, a control operation on a target role from a terminal device is received and a role control instruction is generated. The role control instruction carries a role identifier of the target role.

The gamer can control the terminal device through a mouse, a keyboard, a handle and other devices, and perform the control operation on the target role. The control operation on the target role can be understood as choosing at least one role from the role group configured by the terminal device, and controlling the role to make actions. Therefore, the role control instruction can carry the role identifier of the controlled role. The controlled role is called as the target role. The role identifier can at least include numbers, characters or symbols.

In a step S404, the role control instruction is sent to a server to trigger the server to determine based on the correspondence and the role identifier whether the terminal device has permission of controlling of the target role, and the role control instruction is executed on the target role when the terminal device has the permission of controlling of the target role.

After generating the role control instruction, the terminal device can send the role control instruction to the server to enable the server to determine whether the terminal device has the permission of controlling of the target role. The server's determination method has been described in above embodiments, which will not be repeated here. If the server determines that the terminal device has the permission of controlling of the target role, the server can execute the role control instruction on the target role, thus realizing the control function of the terminal device on the target role.

According to the method for controlling the role in the multi-player competition game provided by embodiments of the present disclosure, the terminal device can generate a role control instruction carrying the role identifier of the target role, and send the role control instruction to the server. When the server determines that the terminal device has the the permission of controlling of the target role, the role control instruction can be executed on the target role. As a result, controlling of the designated target role by the terminal device can be realized. The terminal device cannot control the role without control permission. Therefore, different garners can control different roles, and one role can be controlled by only one garner, so as to improve the game experience of the garners.

Figure 5:
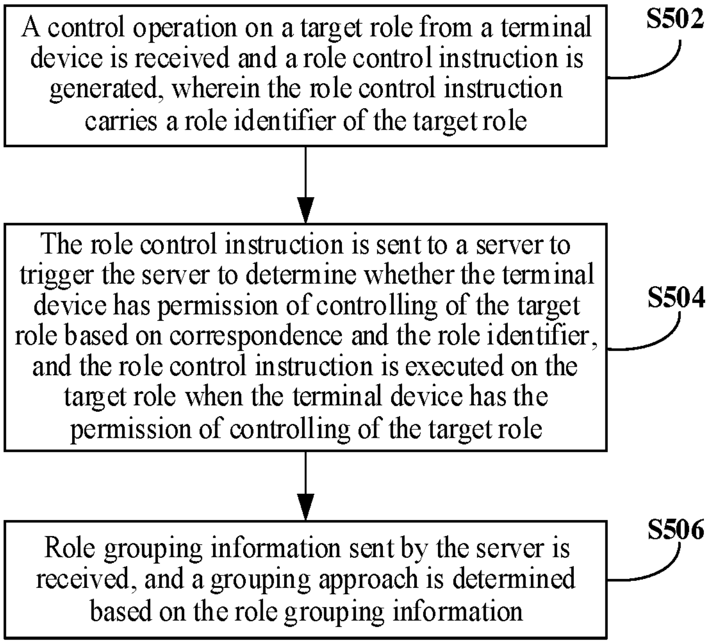
FIG. 5 is a flowchart of another method for controlling a role in a multi-player competition game provided by embodiments of the present disclosure.

Embodiments of the present disclosure provide another method for controlling the role in the multi-player competition game, which is implemented on the basis of above embodiments. Embodiment focuses on the specific implementation of the terminal device to determine role grouping information. As shown in FIG. 5, another method for controlling the role in the multi-player competition game includes following steps.

In a step S502, a control operation on a target role from a terminal device is received and a role control instruction is generated. The role control instruction carries a role identifier of the target role.

In a step S504, the role control instruction is sent to a server to trigger the server to determine whether the terminal device has permission of controlling of the target role based on correspondence and the role identifier, and the role control instruction is executed on the target role when the terminal device has the permission of controlling of the target role.

In a step S506, role grouping information sent by the server is received, and a grouping approach is determined based on the role grouping information.

The terminal device can determine the grouping approach from the role grouping information sent by the server. The role grouping information sent by the server can include at least one grouping approach. Each grouping approach corresponds to one piece of role grouping information. Each role belongs to only one role group in one grouping approach, but the role can belong to different role groups in different grouping approaches. The terminal device can choose the grouping approach from the role grouping information sent by the server through steps B1-B2.

In a step B1, at least one grouping approach sent by the server is received. One grouping approach corresponds to one piece of role grouping information, and each role belongs to only one role group under a certain grouping approach.

At least one grouping approach is stored in the server in advance, which can be uploaded by gamers or preset by the game itself. The server sends the grouping approach to the terminal device for gamers to choose.

In a step B2, a grouping approach choosing operation from the terminal device is received, and a grouping approach chosen through the grouping approach choosing operation is sent to the server.

Gamers can perform the grouping approach choosing operation, to choose through the terminal device one grouping approach from the grouping approaches sent by the server, and send the chosen grouping approach to the server to facilitate the server to store the chosen grouping approach. The server can send the chosen grouping approach to the terminal devices of other gamers in the same team.

Figure 6:
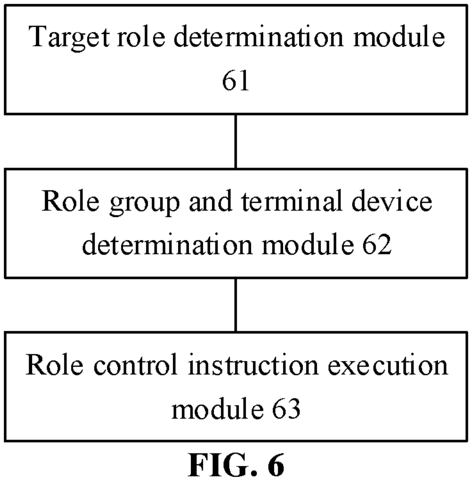
FIG. 6 is a schematic structural diagram of an apparatus for controlling a role in a multi-player competition game provided by embodiments of the present disclosure.

Embodiments of the present disclosure provide an apparatus for controlling a role in a multi-player competition game corresponding to above method embodiments. Role grouping information of the competition game is provided through a server. The role grouping information includes a role group to which each role of at least one game party in the competition game belongs. The server stores correspondence between a terminal device and the role group in a current competition match in advance. FIG. 6 is a schematic structural diagram of an apparatus for controlling a role in a multi-player competition game provided by embodiments of the present disclosure. As shown in FIG. 6, the apparatus includes a target role determination module, a role group and terminal device determination module, and a role control instruction execution module.

The target role determination module 61 is configured to receive a role control instruction from a first terminal device, and determine a target role corresponding to the role control instruction.

The role group and terminal device determination module 62 is configured to determine a target role group to which the target role belongs and a target terminal device corresponding to the target role group based on the correspondence.

The role control instruction execution module 63 is configured to execute the role control instruction on the target role in response to the target terminal device being the first terminal device.

According to the apparatus for controlling the role in the multi-player competition game provided by embodiments of the present disclosure, the role grouping information of the role group to which each role belongs in the game and the correspondence between the terminal device and the role group are recorded through the server. The role control instruction is received from the first terminal device to determine the target role, and whether the target role corresponds to the first terminal device or not is determined based on the correspondence above. If the target role corresponds to the first terminal device, the server executes the role control instruction.

In this mode, the server will execute the role control instruction from the terminal device that has a correspondence with the role. The gamer cannot control the role that does not correspond to his own terminal device. As a result, the roles controlled by different gamers can be different. One gamer can control multiple roles to in the game and the roles he is controlling are not controlled by other gamers, so as to improve the game experience of the gamer.

Figure 7:
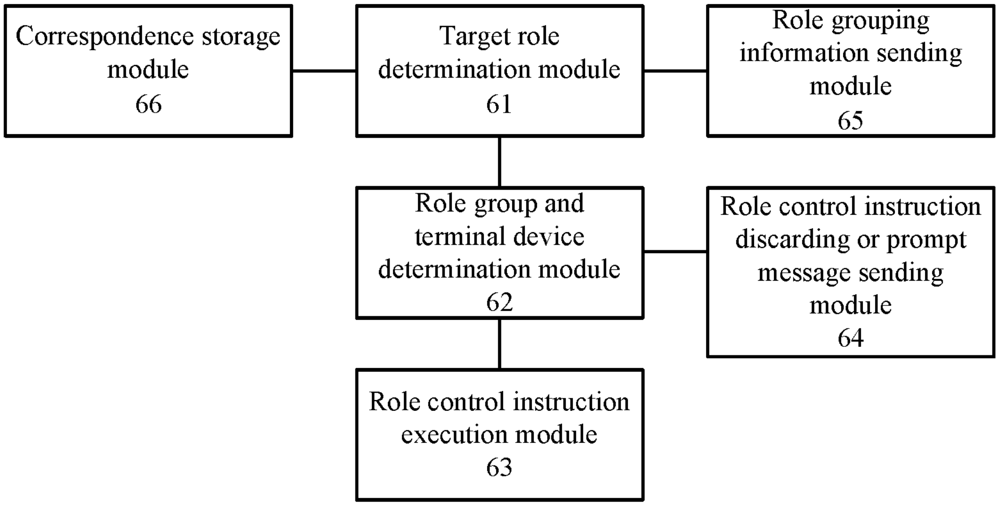
FIG. 7 is a schematic structural diagram of another apparatus for controlling a role in a multi-player competition game provided by embodiments of the present disclosure.

FIG. 7 is a schematic structural diagram of another apparatus for controlling a role in a multi-player competition game provided by embodiments of the present disclosure. The above apparatus further includes a role control instruction discarding or prompt message sending module 64, which is connected with the role group and terminal device determination module 62, and is configured to in response to the target terminal device being not the first terminal device, discard the role control instruction, and/or send a prompt message to the first terminal device. The prompt message is configured to indicate that the first terminal device does not have permission of controlling of the target role.

Referring to the structural diagram of another apparatus for controlling a role in a multi-player competition game shown in FIG. 7, the apparatus further includes a role grouping information sending module 65, which is connected with the target role determination module 61, and is configured to provide the role grouping information to the terminal device through a graphical user interface of the competition game.

The role grouping information sending module is further configured to display at least one grouping approach to the terminal device through the graphical user interface of the competition game, wherein one grouping approach corresponds to one piece of role grouping information, and each role belongs to only one role group under the grouping approach; and to receive a grouping approach choosing operation from the first terminal device of a first game party in the competition game, and setting the role group under the grouping approach chosen through the grouping approach choosing operation as an optional state.

Referring to the structural diagram of another apparatus for controlling a role in a multi-player competition game shown in FIG. 7, the apparatus further includes a correspondence storage module 66, which is connected with the target role determination module 61, and is configured to receive a role group choosing operation from the first terminal device based on the role grouping information, and storing correspondence between the first terminal device and the role group chosen through the role group choosing operation.

Figure 8:
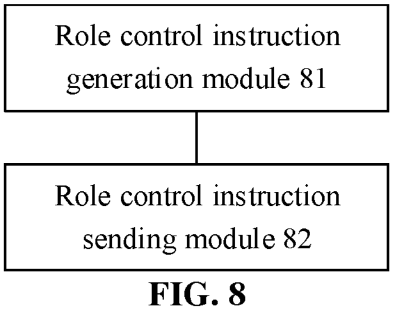
FIG. 8 is a schematic structural diagram of another apparatus for controlling a role in a multi-player competition game provided by embodiments of the present disclosure.

Embodiments of the present disclosure provide an apparatus for controlling a role in a multi-player competition game corresponding to above method embodiments. Role grouping information of the competition game is provided through a server. The role grouping information includes a role group to which each role of at least one game party in the competition game belongs. The server stores correspondence between a terminal device and the role group in a current competition match in advance. FIG. 8 is a schematic structural diagram of another apparatus for controlling a role in a multi-player competition game provided by embodiments of the present disclosure. As shown in FIG. 8, the apparatus includes a role control instruction generation module and a role control instruction sending module.

The role control instruction generation module 81 is configured to receive a control operation on a target role from the terminal device, and generate a role control instruction, wherein the role control instruction carries a role identifier of the target role.

The role control instruction sending module 82 is configured to send the role control instruction to the server to trigger the server to determine based on the correspondence and the role identifier whether the terminal device has permission of controlling of the target role; and execute the role control instruction on the target role when the terminal device has the permission of controlling of the target role.

According to the apparatus for controlling the role in the multi-player competition game provided by embodiments of the present disclosure, the terminal device can generate a role control instruction carrying the role identifier of the target role, and send the role control instruction to the server. When the server determines that the terminal device has the the permission of controlling of the target role, the role control instruction can be executed on the target role. As a result, controlling of the designated target role by the terminal device can be realized. The terminal device cannot control the role without control permission. Therefore, different gamers can control different roles, and one role can be controlled by only one gamer, so as to improve the game experience of the gamers.

Figure 9:
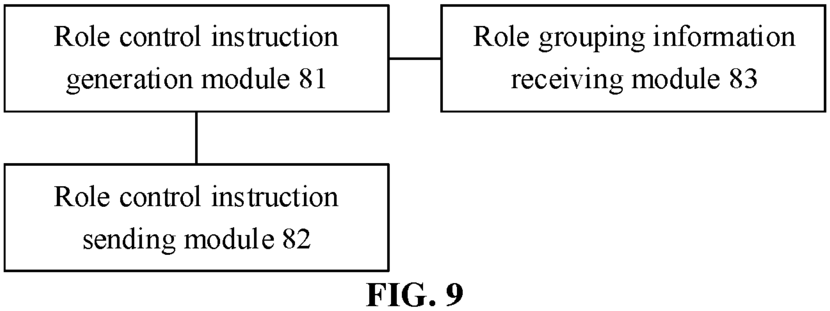
FIG. 9 is a schematic structural diagram of another apparatus for controlling a role in a multi-player competition game provided by embodiments of the present disclosure.

Referring to the structural diagram of another apparatus for controlling a role in a multi-player competition game shown in FIG. 9, the apparatus further includes a role grouping information receiving module 83, which is connected with the role control instruction generation module 81, and is configured to receive role grouping information sent by the server, and determining a grouping approach based on the role grouping information.

The above role grouping information receiving module is configured to receive at least one grouping approach sent by the server, wherein one grouping approach corresponds to one piece of role grouping information, and each role belongs to only one role group under the grouping approach; and to receive a grouping approach choosing operation from the terminal device, and send a grouping approach chosen through the grouping approach choosing operation to the server.

Embodiments of the present disclosure also provide an electronic device for running above method for controlling the role in the multi-player competition game. Referring to the structural diagram of an electronic device shown in FIG. 10, the electronic device includes a memory 100 and a processor 101. The memory 100 is configured to store one or more computer instructions, and the one or more computer instructions can be executed by the processor 101 to realize above method for controlling the role in the multi-player competition game.

Figure 10:
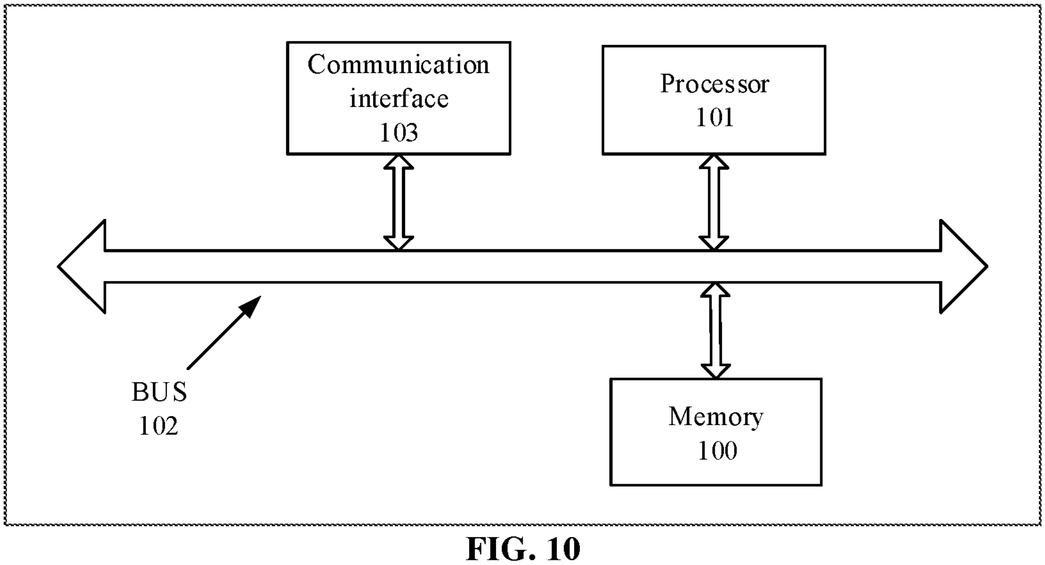
FIG. 10 is a schematic structural diagram of an electronic device provided by embodiments of the present disclosure.

In some embodiments, the electronic device shown in FIG. 10 further includes a bus 102 and a communication interface 103, and the processor 101, the communication interface 103 and the memory 100 are connected through the bus 102.

The memory 100 may include high-speed random access memory (RAM) or non-volatile memory, such as at least one disk memory. The communication connection between the system network element and at least one other network element is realized through at least one communication interface 103 (which can be wired or wireless). The Internet, WAN, LAN, MAN, etc., can be used. The bus 102 can be an ISA bus, a PCI bus, an EISA bus, etc. The bus can be divided into an address bus, a data bus, a control bus, etc. For ease of representation, only one bidirectional arrow is used in FIG. 10, but it does not mean that there is only one bus or one type of bus.

The processor 101 may be an integrated circuit chip with signal processing capability. In the implementation process, steps of the above method can be achieved by the integrated logic circuit of hardware or instructions in the form of software in the processor 101. The processor 101 can be a general-purpose processor, including a central processing unit (CPU), a network processor (NP), etc. The processor 101 can also be a digital signal processor (DSP), an application specific integrated circuit (ASIC), a field programmable gate array (FPGA) or other programmable logic devices, discrete gates or transistor logic devices, discrete hardware components. Each method, step and logic block diagram disclosed in embodiments of the present disclosure can be implemented or executed. A general-purpose processor may be a microprocessor or the processor may also be any conventional processor or the like. The steps of the method disclosed in combination with the embodiments of the present disclosure can be directly embodied in the completion of the hardware decoding processor or the combination of hardware and software modules in the decoding processor. Software modules can be located in RAM, flash memory, read-only memory, programmable read-only memory or electrically erasable programmable memory, registers and other mature storage media in the art. The storage medium is located in the memory 100, and the processor 101 reads the information in the memory 100 and implements the steps of the method provided by preceding embodiments in combination with its hardware.

Embodiments of the present disclosure also provide a computer-readable storage medium, which stores computer executable instructions. When the computer executable instructions are called and executed by the processor, the computer executable instructions cause the processor to implement above method for controlling the role in the multi-player competition game provided by method embodiments, which will not be repeated here.

The method for controlling the role in the multi-player competition game, the apparatus for controlling the role in the multi-player competition game and the electronic device provided by embodiments of the present disclosure include a computer-readable storage medium that stores program codes. The instructions included in the program codes can be configured to execute the methods in preceding method embodiments. References can be made to above method embodiments, and will not be repeated here.

Those skilled in the art can clearly understand that, for the convenience and simplicity of description, the specific working process of the above described system and/or device can refer to the corresponding process in above method embodiments, and will not be repeated here.

In addition, in the description of embodiments of the present disclosure, unless otherwise specified and defined, the terms "installation", "coupling" and "connection" should be understood broadly, for example, they can be fixed connection, removable connection, or integrated connection. They can be mechanical connection or electrical connection. They can be directly connected, or indirectly connected through intermediate media. They can be the connection between two components. For those skilled in the art, the specific meaning of the above terms in the present disclosure can be understood in specific cases.

If the functions are realized in the form of software functional units and sold or used as independent products, they can be stored in a computer readable storage medium. Based on this understanding, the technical solution of the present disclosure can be embodied in the form of a software product, which is stored in a storage medium, A number of instructions are included to enable a computer device (which may be a personal computer, an electronic device, or a network device, etc.) to perform all or part of the steps of the method described in various embodiments of the present disclosure. The aforementioned storage medium includes USB flash disk, mobile hard disk, read only memory (ROM), random access memory (RAM), magnetic disc or optical disc and other media that can store program codes.

In the description of the present disclosure, it should be noted that the terms "center", "top", "bottom", "left", "right", "vertical", "horizontal", "inside", "outside", etc., indicate the orientation or position relationship based on the orientation or position relationship shown in the drawings, only for the convenience of describing the present disclosure and simplifying the description, rather than indicating or implying that the device or element referred to must have a specific orientation, or constructed and operated in a specific orientation, and therefore cannot be understood as a limitation of the present disclosure. In addition, the terms "first", "second" and "third" are only used for describing purposes and cannot be understood as indicating or implying relative importance.

Finally, it should be noted that above embodiments are only specific embodiments of the present disclosure to illustrate technical solutions of the disclosure, rather than limit the disclosure. The scope of protection of the disclosure is not limited to this. Although the disclosure has been described in detail with reference to aforementioned embodiments, those skilled in the art should understand that any skilled person familiar with the technical field can still modify or easily think of changes to the technical solutions recorded in the aforementioned embodiments, or equivalently replace some of the technical features within the scope of the disclosure. However, these modifications, changes or substitutions do not make the nature of the corresponding technical solutions deviate from the spirit and scope of the technical solutions of embodiments of the present disclosure, and should be covered in the protection scope of the present disclosure. Therefore, the protection scope of the present disclosure shall be subject to the scope of appended claims.

What is claimed is:

1. A method for controlling a role in a multi-player competition game, wherein role grouping information of the competition game is provided through a server, the role grouping information comprising a role group to which each role of at least one game party in the competition game belongs, and the server stores correspondence between a terminal device and the role group in a current competition match in advance; the method comprising:

receiving a role control instruction from a first terminal device, and determining a target role corresponding to the role control instruction;

determining a target role group to which the target role belongs and a target terminal device corresponding to the target role group based on the correspondence;

executing the role control instruction on the target role in response to the target terminal device being the first terminal device; and in response to the target terminal device being not the first terminal device, performing at least one of:

discarding the role control instruction, or sending a prompt message to the first terminal device, wherein the prompt message is configured to indicate that the first terminal device does not have permission of controlling of the target role.

2. The method according to claim 1, further comprising:

providing the role grouping information to the terminal device through a graphical user interface of the competition game.

3. The method according to claim 2, wherein providing the role grouping information to the terminal device through a graphical user interface of the competition game comprises:

displaying at least one grouping approach to the terminal device through the graphical user interface of the competition game, wherein one grouping approach corresponds to one piece of role grouping information, and each role belongs to only one role group under the grouping approach; and receiving a grouping approach choosing operation from the first terminal device of a first game party in the competition game, and setting the role group under the grouping approach chosen through the grouping approach choosing operation as an optional state.

4. The method according to claim 3, further comprising:

displaying through the server the grouping approach chosen by the first terminal device to other terminal devices of the first game party, for the other terminal devices of the first game party to make further choices.

5. The method according to claim 1, further comprising:

receiving a role group choosing operation from the first terminal device based on the role grouping information, and storing correspondence between the first terminal device and the role group chosen through the role group choosing operation.

6. A non-transitory computer-readable storage medium having computer-executable instructions stored thereon, which when executed by a processor, the processor is caused to implement the method for controlling the role in the multi-player competition game according to claim 1.

7. A method for controlling a role in a multi-player competition game, wherein a graphical user interface of the competition game is displayed through a terminal device, the terminal device is pre-configured with at least one role group, and correspondence between the role group and the terminal device is stored in a server of the competition game; the method comprising:

receiving a control operation on a target role from the terminal device, and generating a role control instruction, wherein the role control instruction carries a role identifier of the target role; and sending the role control instruction to the server to trigger the server to determine based on the correspondence and the role identifier whether the terminal device has permission of controlling of the target role;

executing the role control instruction on the target role when the terminal device has the permission of controlling of the target role; and when the terminal device does not have the permission of controlling of the target role, performing at least one of:

discarding the role control instruction, or receiving a prompt message sent by the server, wherein the prompt message is configured to indicate that the terminal device does not have the permission of controlling of the target role.

8. The method according to claim 7, further comprising:

receiving role grouping information sent by the server, and determining a grouping approach based on the role grouping information.

9. The method according to claim 8, wherein receiving role grouping information sent by the server, and determining a grouping approach based on the role grouping information comprises:

receiving at least one grouping approach sent by the server, wherein one grouping approach corresponds to one piece of role grouping information, and each role belongs to only one role group under the grouping approach; and receiving a grouping approach choosing operation from the terminal device, and sending a grouping approach chosen through the grouping approach choosing operation to the server.

10. The method according to claim 7, wherein the role identifier comprises numbers, characters or symbols.

11. An electronic device comprising a processor and a memory, wherein the memory stores computer-executable instructions that can be executed by the processor, and the processor is configured to execute the computer-executable instructions to implement the method for controlling the role in the multi-player competition game according to claim 7.

12. A non-transitory computer-readable storage medium having computer-executable instructions stored thereon, which when executed by a processor, the processor is caused to implement the method for controlling the role in the multi-player competition game according to claim 7.

13. An electronic device comprising a processor and a memory, wherein the memory stores computer-executable instructions that can be executed by the processor, and the processor executes the computer-executable instructions to cause the processor to be configured to:

receive a role control instruction from a first terminal device, and determine a target role corresponding to the role control instruction;

determine a target role group to which the target role belongs and a target terminal device corresponding to the target role group based on the correspondence;

execute the role control instruction on the target role in response to the target terminal device being the first terminal device; and in response to the target terminal device being not the first terminal device, perform at least one of:

discard the role control instruction, or send a prompt message to the first terminal device, wherein the prompt message is configured to indicate that the first terminal device does not have permission of controlling of the target role.

14. The electronic device according to claim 13, wherein the processor is further configured to:

provide the role grouping information to the terminal device through a graphical user interface of the competition game.

15. The electronic device according to claim 14, wherein the processor is further configured to:

display at least one grouping approach to the terminal device through the graphical user interface of the competition game, wherein one grouping approach corresponds to one piece of role grouping information, and each role belongs to only one role group under the grouping approach; and receive a grouping approach choosing operation from the first terminal device of a first game party in the competition game, and set the role group under the grouping approach chosen through the grouping approach choosing operation as an optional state.

16. The electronic device according to claim 15, wherein the processor is further configured to:

display through the server the grouping approach chosen by the first terminal device to other terminal devices of the first game party, for the other terminal devices of the first game party to make further choices.

17. The electronic device according to claim 13, wherein the processor is further configured to:

receive a role group choosing operation from the first terminal device based on the role grouping information, and store correspondence between the first terminal device and the role group chosen through the role group choosing operation.

* * * * *